(12) United States Patent
Goel et al.

(10) Patent No.: US 8,259,111 B2
(45) Date of Patent: Sep. 4, 2012

(54) MERGED SHADER FOR PRIMITIVE AMPLIFICATION

(75) Inventors: Vineet Goel, Winter Park, FL (US); Todd Martin, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 980 days.

(21) Appl. No.: 12/185,474

(22) Filed: Aug. 4, 2008

(65) Prior Publication Data
US 2009/0295804 A1    Dec. 3, 2009

Related U.S. Application Data

(60) Provisional application No. 61/057,465, filed on May 30, 2008.

(51) Int. Cl.
*G06T 15/50* (2006.01)
*G06T 15/10* (2006.01)
*G06T 1/20* (2006.01)
(52) U.S. Cl. .................. 345/426; 345/427; 345/506
(58) Field of Classification Search .......... 345/419, 345/423, 426, 427, 505, 506
See application file for complete search history.

(56) References Cited

U.S. PATENT DOCUMENTS

| | | | | |
|---|---|---|---|---|
| 7,692,660 B2* | 4/2010 | Markovic et al. | ............ | 345/522 |
| 7,701,459 B1* | 4/2010 | Mrazek et al. | ................ | 345/505 |
| 7,843,463 B1* | 11/2010 | Kilgard | ......................... | 345/584 |

* cited by examiner

*Primary Examiner* — Hau Nguyen
(74) *Attorney, Agent, or Firm* — Sterne, Kessler, Goldstein & Fox PLLC

(57) ABSTRACT

A method, computer program product, and system are provided for processing data in a graphics pipeline. An embodiment of the method includes processing one or more vertices of a geometric primitive with a vertex shader function and generating new primitive information for the one or more processed vertices with a geometry shader function. The geometry shader function receives one or more processed vertices from the vertex shader function and emits a single vertex associated with the new primitive information. Each emitted vertex from the geometry shader function can be stored in a memory device. Unlike conventional graphic pipelines that require a memory device for data storage during the vertex and geometry shading processes, the present invention increases efficiency in the graphics pipeline by eliminating the need to access memory when the vertex and geometry shaders process vertex information.

25 Claims, 8 Drawing Sheets

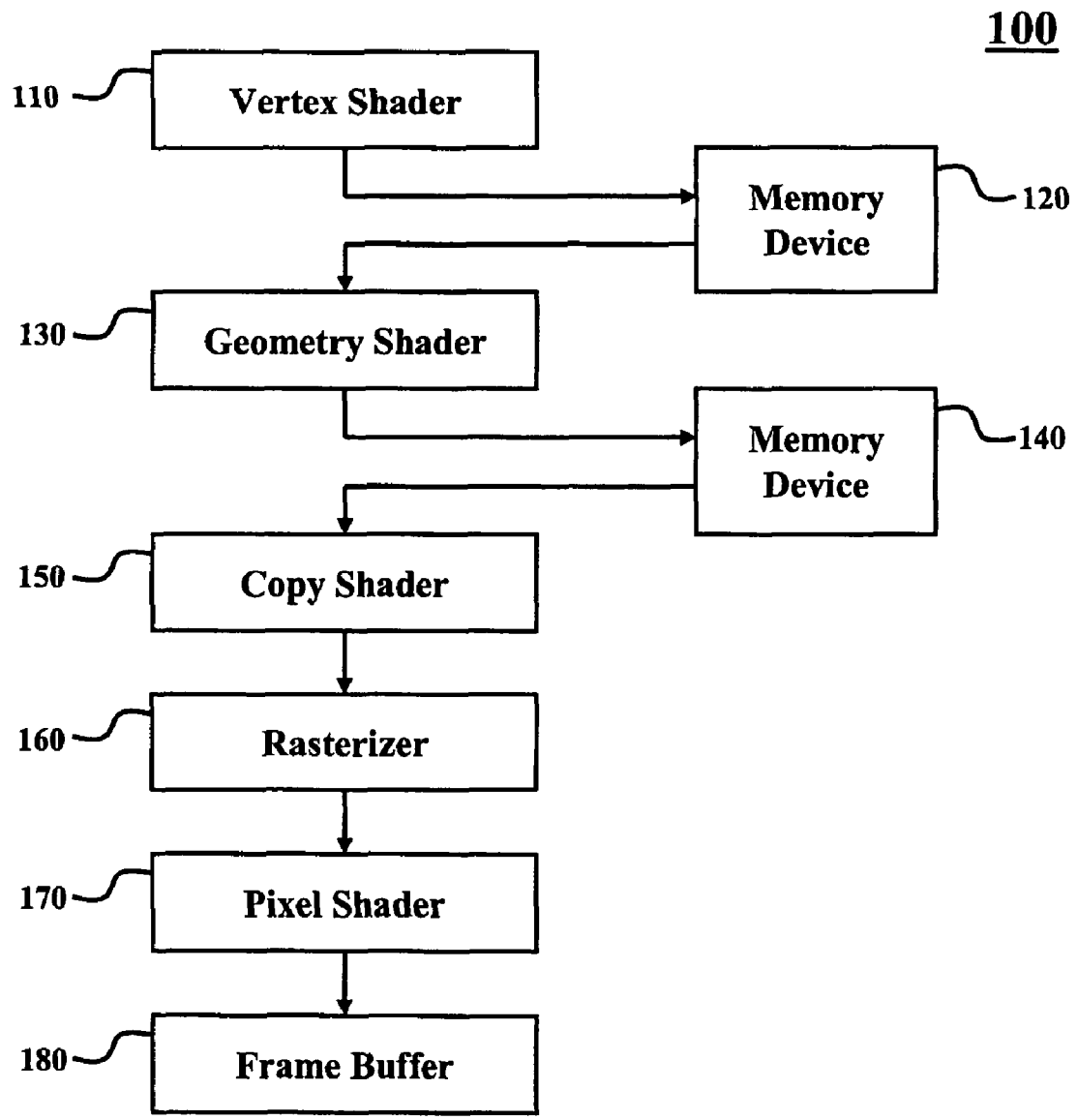
Figure 1
(Conventional)

MERGED SHADER FOR PRIMITIVE AMPLIFICATION

CROSS-REFERENCE TO RELATED APPLICATION

This application claims benefit of U.S. Provisional Application No. 61/057,465, filed May 30, 2008, titled "Merged Shader for Primitive Amplification," which is incorporated herein by reference in its entirety.

BACKGROUND

1. Field of the Invention

The present invention relates generally to optimizing shading operations and memory traffic in a graphics processing unit.

2. Background

A graphics processing unit (GPU) is a complex integrated circuit that is specially designed to perform graphics processing tasks. A GPU can, for example, execute graphics processing tasks required by an end-user application, such as a video game. Some currently available GPUs use a technique known as pipelining to execute graphics instructions. Pipelining enables a GPU to work on different steps of an instruction at the same time, thus taking advantage of parallelism that exists among steps required to execute the instruction. As a result, pipelining streamlines graphics processing by enabling the GPU to execute more instructions in a shorter period of time.

Modern graphics pipelines accept input in a variety of formats, but the most widely used representation for geometry is based on vertex and index buffers. The vertex buffer provides three-dimensional coordinates and attributes for a set of vertices. The index buffer defines a set of geometric primitives. A commonly used geometric primitive is a triangle, where vertex information of the triangle is stored in the vertex buffer.

As each triangle is processed by the GPU for rendering, vertices of the triangle are processed by a vertex shader. This operation can be computationally expensive due to the combination of the arithmetic logic unit (ALU) instructions required to process each vertex (e.g., transform and lighting) and the computing bandwidth required to load the processed vertex data (e.g., position, color, and texture coordinates) into memory. Oftentimes, the processed vertex data is loaded into a memory device.

Another potential bottleneck in the graphics pipeline exists during geometry shading. Geometry shading occurs after vertex shading and enables the GPU to add geometric detail to an existing primitive by generating (or "emitting") new primitives. Alternatively, the geometry shader can emit zero primitives. The primitives emitted from the geometry shader are then rasterized, where fragments (or pixels) from the rasterization process are ultimately passed to a pixel shader for further processing.

Rendering costs during geometry shading are attributed to the ALU instructions required to process each primitive, the computing bandwidth associated with vertex lookup from the vertex shader's memory, and the computing bandwidth required to load the processed data into memory. Oftentimes, similar to the vertex shader, data processed by the geometry shader data is loaded into a memory device.

Rendering costs attributed to the vertex and geometry shaders can dominate the total rendering cost of the graphics pipeline. For some applications, the rendering costs attributed to the vertex and geometry shader may be unavoidable due to design constraints such as performance and circuit area of the GPU. For instance, for a high volume of primitive data entering the graphics pipeline, the geometry shader may emit a large number of primitives for each vertex processed by the vertex shader. Here, off-chip memory may be required such that latency periods between the vertex shader and geometry shader operations can be hidden. In the alternative, potential latency issues can be resolved by adding on-chip memory to the GPU, thus increasing overall circuit area. However, an increase in circuit area of the GPU is counterbalanced by manufacturing costs associated with the fabrication of a larger graphics chip. Thus, in light of performance and cost factors, off-chip memory may be a feasible solution for many GPU designs.

In situations where a low volume of primitive data enters the graphics pipeline and the geometry shader does not emit a large number of primitives for each vertex processed by the vertex shader, then the loading of processed data into, and retrieving of the data from, off-chip memory can be inefficient. Here, a latency period between the vertex shader and geometry shader operations can increase (relative to processing time) due to a small number of primitives being emitted from the geometry shader. In other words, since the geometry shader emits a small number of primitives, the computing time associated with retrieving data from the vertex shader's memory and loading data processed by the geometry shader into off-chip memory is more than the computing time for the geometry shader to emit primitives. As the geometry shader processes more vertex data with a small number of emits, the latency period of the geometry shader's operation increases, thus increasing the overall rendering cost of the graphics pipeline.

Accordingly, what is needed is an improved method to reduce the rendering costs attributed to the vertex and geometry shaders by eliminating the need to access memory when processing vertex information.

SUMMARY

Embodiments of the invention include a method for processing data in a graphics pipeline. The method includes processing one or more vertices of a geometric primitive with a vertex shader function, where the geometric primitive is an input to the graphics pipeline, and generating new primitive information with a geometry shader function. An example of the geometric primitive is a triangle, where each vertex of the triangle is processed by the vertex shader function. The vertex shader function can process each vertex in a sequential operation (e.g., one at a time), where this sequential operation can be performed in parallel for N vertex shader functions (N is equal to a total number of vertices emitted by one or more geometry shader functions).

The geometry shader function receives one or more processed vertices from the vertex shader function and emits a single vertex associated with the new primitive information. This single vertex can be associated with a vertex index, where the vertex index is indicative of a total number of emitted vertices by one or more geometry shader functions. Similar to the vertex shader function, the geometry shader function can also operate in parallel, where it processes one or more inputs from the vertex shader function in parallel for N geometry shader functions.

The method for processing data in the graphics pipeline can also include storing the new primitive information for each emitted vertex in a memory device and connecting a plurality of stored emitted vertices prior to a rasterization process in the graphics pipeline. An example of a memory device that can be used to store primitive information for each emitted vertex is cache memory. Within the cache memory, a boundary between two or more emitted geometric primitives in the graphics pipeline can be made to facilitate the connecting step. In connecting the plurality of stored emitted vertices, a setup engine in the graphics pipeline can be used to provide information on the connectivity of vertices stored in the memory device. In turn, a rasterizer can rapidly access the data in the memory device and convert the data into a raster image, where fragments (or pixels) from the rasterization process are ultimately passed to a pixel shader for further processing.

Embodiments of the invention additionally include a computer program product comprising a computer-usable medium having computer program logic recorded thereon for enabling a processor to process data in a graphics pipeline. The computer program product includes computer readable program code that enables a processor to perform the following: process one or more vertices of a geometric primitive with a vertex shader function, where the geometric primitive is an input to the graphics pipeline; and, generate new primitive information with a geometry shader function, where the geometry shader function receives one or more processed vertices from the vertex shader function and emits a single vertex associated with the new primitive information. The computer program logic can additionally include computer readable program code to enable a processor to store the new primitive information for each emitted vertex in a memory device and to connect a plurality of stored emitted vertices prior to a rasterization process in the graphics pipeline.

Embodiments of the invention include a system for processing data in a graphics pipeline. The system includes a first module to process one or more vertices of a geometric primitive with a vertex shader function, where the geometric primitive is an input to the graphics pipeline, and a second module to generate new primitive information with a geometry shader function, wherein the geometry shader function receives one or more processed vertices from the vertex shader function and emits a single vertex associated with the new primitive information. Furthermore, the system can include a third module to store the new primitive information for each emitted vertex in a memory device and a fourth module to connect a plurality of stored emitted vertices prior to a rasterization process in the graphics pipeline.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

FIG. 1 is an illustration of a conventional graphics pipeline.

Figure 2B:
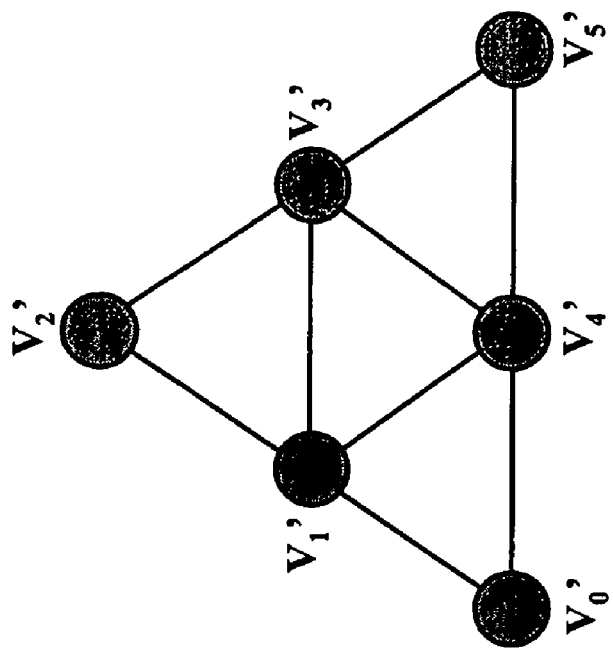
FIG. 2(b) is an illustration of an example plurality of primitives emitted from a geometry shader in the form of a tessellated triangle, based on a triangle primitive input into the geometry shader.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the Figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is an illustration of a conventional graphics pipeline 100. Graphics pipeline 100 typically accepts a representation of a three-dimensional scene, processes the representation, and outputs a two-dimensional raster image. Graphics pipeline 100 includes a vertex shader 110, memory devices 120 and 140, a geometry shader 130, a copy shader 150, a rasterizer 160, a pixel shader 170, and a frame buffer 180. These stages of graphics pipeline 100 process data that is initially properties at end points (or vertices) of a geometric primitive, where the primitive provides information on an object being rendered. Typical primitives in three-dimensional graphics include triangles and lines, where the vertices of these geometric primitives provide information on, for example, x-y-z coordinates, texture, and reflectivity.

Vertex shader 110 converts each vertex from the primitive into a two-dimensional screen position and may also define a color for each vertex. Vertex shader 100 does not change the type of data encompassed in each vertex but, rather, it changes the value of the data so that the vertex appears as a different color, texture, or position on the screen. After vertex shader 110 processes the vertices from the primitive, each processed vertex is stored in a memory location in memory device 120. Memory device 120 (and memory device 140, which is described below) can be located either on the same chip as the GPU or off-chip. Examples of memory devices that can be used for storage of vertex data are dynamic random access memory and static random access memory. In the alternative, other types of memory storage devices can be used.

Geometry shader 130 retrieves vertex data from memory device 120 and can generate (or "emit") new graphics primitives, such as lines and triangles, from the vertex data in memory device 120. In particular, geometry shader 130 retrieves vertex data for a primitive, as a whole, and emits zero or more primitives. For example, geometry shader 130 can operate on a triangle primitive with three vertices $V_0$, $V_1$, and $V_2$.

Figure 2A:
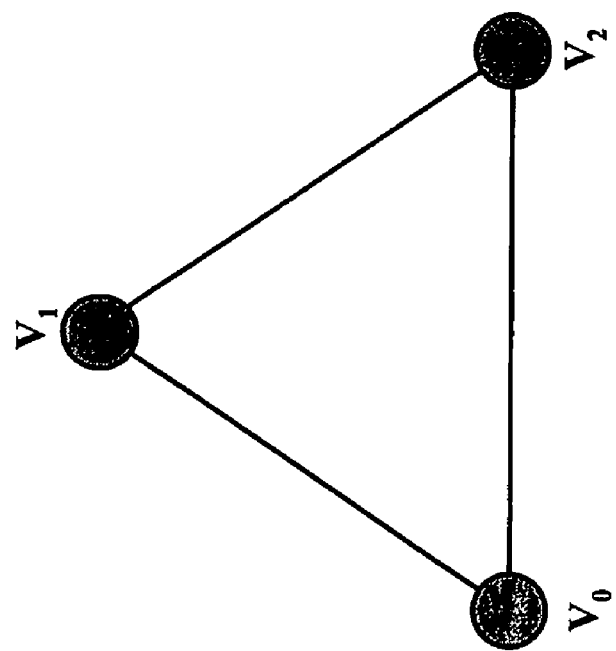
FIG. 2(a) is an illustration of an example triangle primitive with three vertices.

FIG. 2(a) is an illustration of an example triangle primitive with three vertices. When operating on the triangle primitive, geometry shader 130 retrieves the three vertices from memory device 120 and emits a plurality of primitives.

FIG. 2(b) is an illustration of an example plurality of primitives emitted from geometry shader 130. As illustrated in FIG. 2(b), geometry shader 130 emits a tessellated configuration of the triangle primitive input, where the tessellation includes vertices $V_0'$-$V_5'$. Each vertex emitted from geometry shader 130 is stored in memory device 140.

Prior to rasterizer 160 processing the data in memory device 140, the data in memory device 140 is copied into a cache memory (not shown) by copy shader 150 so that rasterizer 160 can have rapid access to the data. Rasterizer 160 converts the data in the cache memory into a raster image (e.g., pixels or dots) for output, for example, on a video display. At a high level, assuming that geometry shader 130 emitted data relating to triangle primitives, rasterizer 160 receives a stream of vertex information from the cache memory, transforms the data into corresponding two-dimensional points to be displayed (e.g., on a video display), and fills in the transformed two-dimensional triangles with pixels (or fragments) as appropriate. Conventional techniques of rasterization are known to persons of ordinary skill in the relevant art.

Pixel shader 170 manipulates pixels generated by rasterizer 160. Pixel shader 170 enables graphics functions on a per-pixel basis, such as additional texture or final color to a pixel. For example, pixel shader 170 can add bump mapping, shadow, and explosion effects to a pixel.

Frame buffer 180 interfaces with physical memory used to hold the actual pixel on a screen or display.

For high-speed, three-dimensional graphics rendering applications, graphics pipeline 100 can be inefficient for certain input data scenarios. For instance, in the case where one primitive is received by vertex shader 110 and a small number of primitives are emitted by geometry shader 130, the graphics processing of this set of data can be inefficient. Currently, to process this set of data, conventional graphics pipeline 100 retrieves data from memory devices 120 and 140 so that geometry shader 130 and copy shader 150, respectively, can process the data. The computation time to write vertex data to the memory devices and then read the data from these memory devices can take a significant amount of computation time, especially in light of certain input data scenarios, such as one primitive received by vertex shader 110 and a small number of primitives emitted by geometry shader 130.

As vertex shader 110 receives an increase in volume of input data with one primitive, where geometry shader 130 emits a small number of primitives for each primitive, the efficiency of graphics pipeline 100 in processing this set of data decreases due to the computation time in writing to and reading from memory devices 120 and 140. A method is needed to overcome this drawback of the conventional graphics pipeline. This method increases efficiency in the graphics pipeline by eliminating the need to access memory when the graphics pipeline receives certain types of input data streams.

In the following description, for purposes of explanation, specific details are set forth to provide a thorough understanding of the present invention. It will be evident, however, to one skilled in the relevant art that the present invention can be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 3:
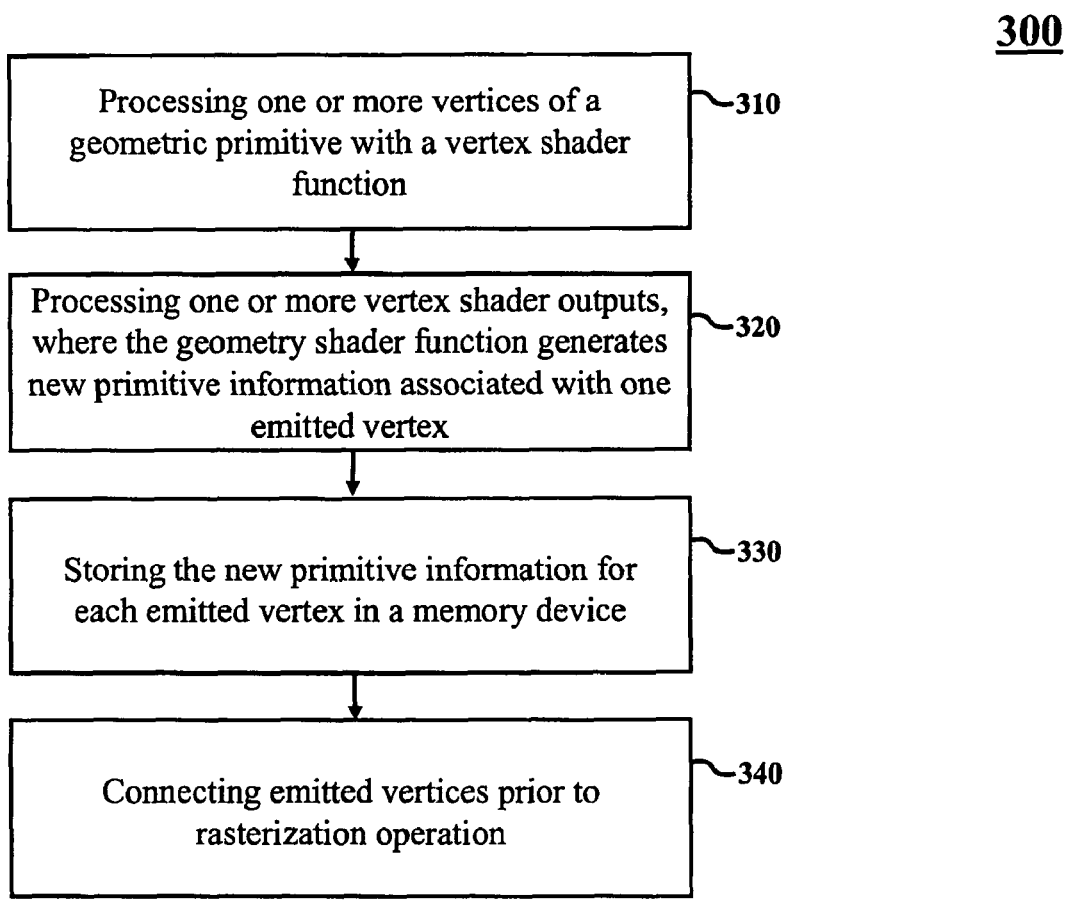
FIG. 3 is an illustration of an embodiment of a method for increasing efficiency in a graphics pipeline.

FIG. 3 is an illustration of an embodiment of a method 300 for increasing efficiency in a graphics pipeline. Method 300 can optimize the performance of a graphics pipeline when the graphics pipeline receives data consisting of one primitive and emits a small number of primitives. The graphics operation of receiving one primitive and emitting a number of primitives from the single primitive is known as primitive amplification.

Figure 4:
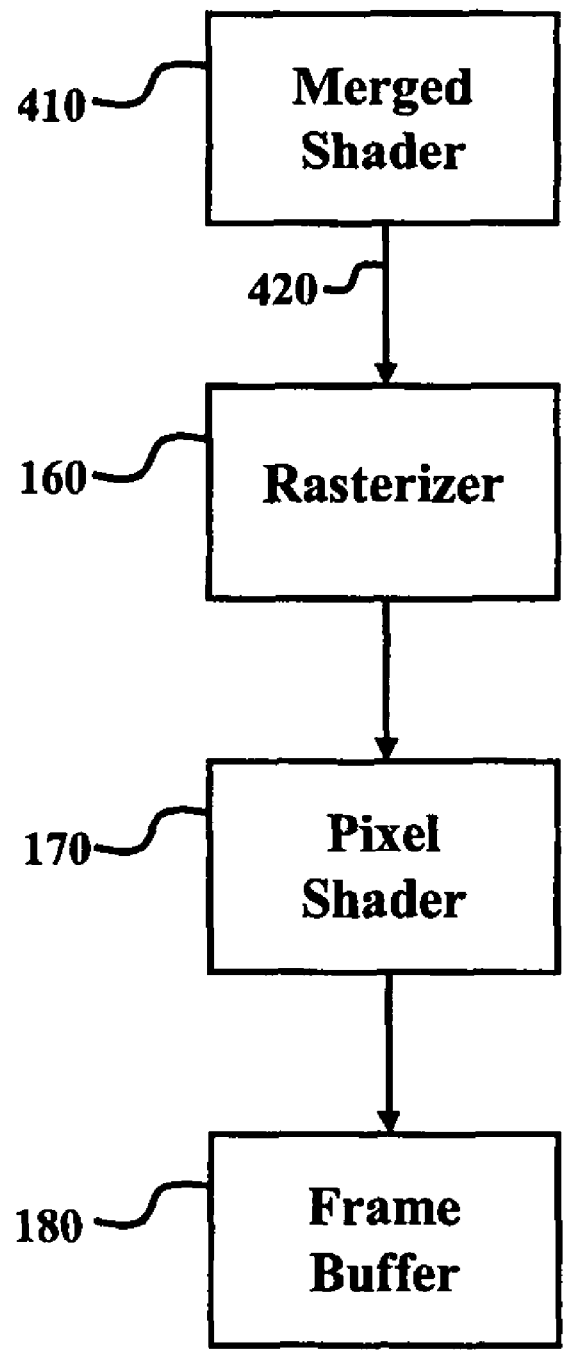
FIG. 4 is an illustration of an example graphics pipeline implementing an embodiment of a method for increasing efficiency in the graphics pipeline.

FIG. 4 is an illustration of an example graphics pipeline 400 implementing method 300. Here, method 300 can be implemented in a merged shader function 410. Merged shader function 410 encompasses the functions of vertex shader 110, geometry shader 130, and copy shader 150 from FIG. 1. However, in contrast to the conventional method described above with respect to FIG. 1, merged shader function 410 does not require access to memory (e.g., no access to either on-chip or off-chip memory devices) when amplifying primitives. Graphics pipeline 400 may be present in a GPU, a CPU, or a device combining aspects of both a CPU and GPU.

In method 300, the number of emitted primitives is design specific and it is desirable to choose a number of emits such that arithmetic logic unit (ALU) operations per emit are low, thus reducing overall graphics processing time as compared to performing the same function with an access to a memory device. In addition, method 300 can also alleviate bandwidth constraints in GPU memory by processing vertex information without the need to access memory, thus allowing other types of input data streams to be processed using the GPU memory. Based on the discussion herein, a person of ordinary skill in the relevant art will also recognize that method 300 can be used to process other types of input data streams received by graphics pipeline 400.

Figure 5:
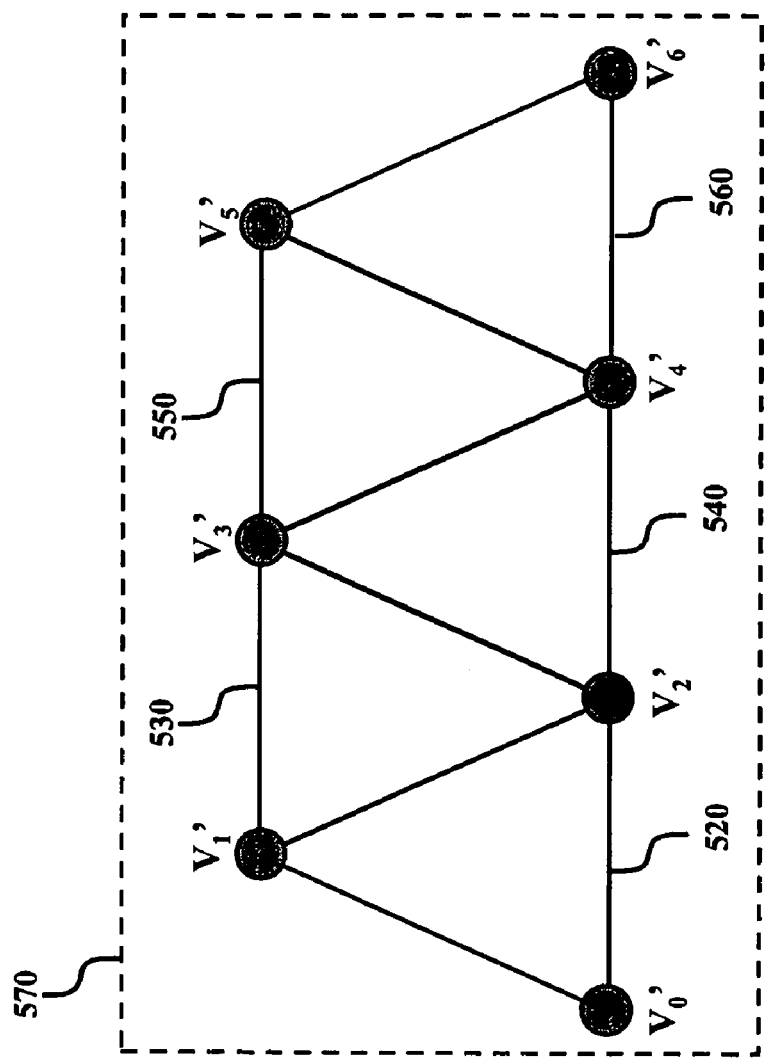
FIG. 5 is an illustration of an example triangle primitive that can be received by an embodiment of a merged shader function and an example triangle primitive strip that can be generated by the merged shader function.
Figure 5:
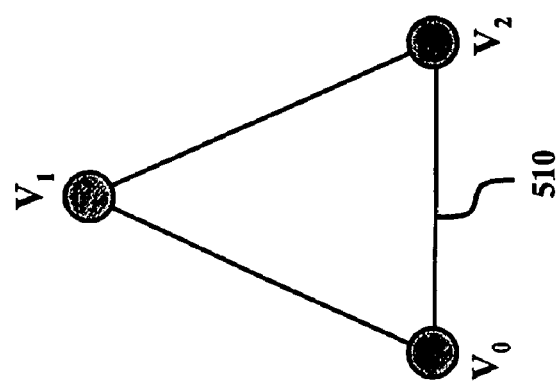

For ease of explanation, method 300 will be described with example geometric primitives in FIG. 5. FIG. 5 is an illustration of an example triangle primitive 510 that can be received by merged shader function 410 and an example triangle primitive strip 570 that can be generated by merged shader function 410. Triangle primitive strip 570 (also referred to herein as triangle strip) is composed of a plurality of triangle primitives 520-560 with vertices $V_0'$-$V_6'$, where edges of triangles 520-560 are shared so that data bandwidth can be optimized in graphics pipeline 400. Triangle strip compression is known to those of ordinary skill in the relevant art.

Based on the discussion herein, a person of ordinary skill in the relevant art will recognize that other types of primitives can be received by merged shader function 410, different number of primitives and types of primitives can be generated by merged shader function 410, and a different geometry compression technique can also be used.

Method 300 can occur, for example, using vector information relating to triangle primitive 510 and triangle strip 570. This vector information can include a vertex number ("vert_num") parameter, a primitive identification ("primID") parameter, and one or more indices. The vert_num parameter is associated with each emitted vertex from merged shader function 410. For instance, a vert_num parameter is associated with each vertex in triangle strip 570, where a "vert_num=0" corresponds to $V_0'$, a "vert_num=1" corresponds to $V_1'$, a "vert_num=2" corresponds to $V_2'$, and so forth.

The primID parameter is associated with each geometric primitive received by merged shader function 410. For example, in FIG. 5, only one triangle primitive (e.g., triangle primitive 510) is assumed to enter merged shader function 410 and thus triangle primitive 510 can have a "primID=0" to indicate that it is the first primitive entering graphics pipeline 400. For subsequent geometric primitives that enter graphics pipeline 400, the primid parameter increments in value. For instance, if a subsequent triangle primitive enters graphics pipeline 400, then this triangle primitive can have a value of "primID=1."

An index is associated with each vertex of a geometric primitive received by merged shader function 410. For example, index0 is associated with vertex $V_0$, index1 is associated with vertex $V_1$, and index2 is associated with vertex $V_2$ in triangle primitive 510 of FIG. 5.

Figure 6:
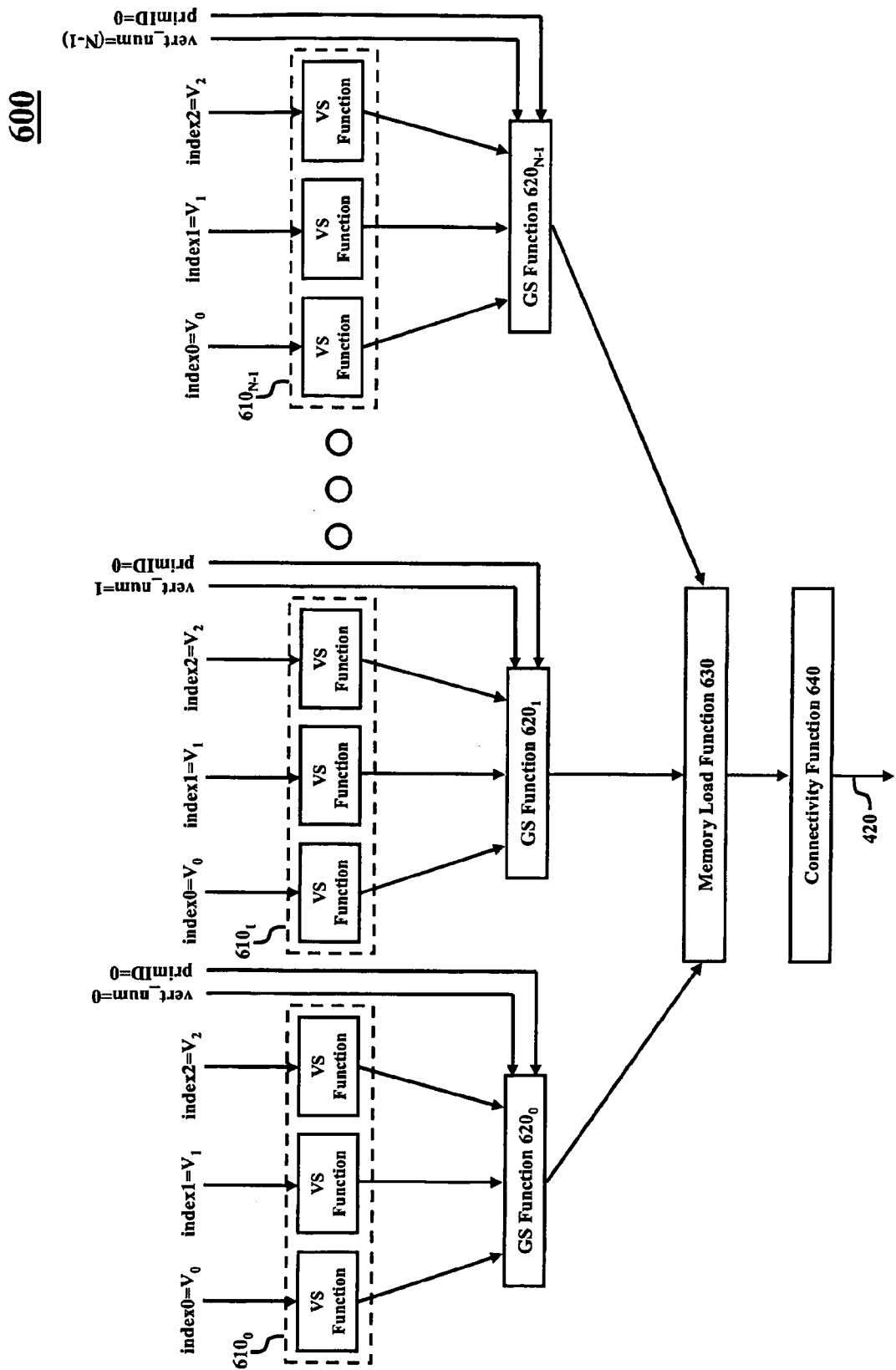
FIG. 6 is an illustration of an example program flow to facilitate with a description of an embodiment of a method for increasing efficiency in a graphics pipeline.

FIG. 6 is an illustration of an example program flow 600 to further facilitate with the description of method 300. Program flow 600 includes vector information (e.g., index0, index1, index2, vert_num, and primID), vertex shader functions $610_0$-$610_{N-1}$, geometry shader functions $620_0$-$620_{N-1}$, a memory load function 630, and a connectivity function 640. N represents a total number of vertices emitted by the geometry shader functions.

In turning to method 300 in FIG. 3, step 310 processes one or more vertices of a geometric primitive with a vertex shader function. The vertex shader function converts each vertex from a geometric primitive into a two-dimensional screen position and may also define a color and texture for each vertex. In an embodiment, the number of vertex shader operations that can perform in parallel can equal to N number of vertices emitted from merged shader function 410 in FIG. 4. Merged shader function 410 generates, for example, triangle primitive strip 570 with N=7 vertices (e.g., vertices $V_0'$-$V_6'$). Thus, there can be 7 vertex shader operations performed in parallel.

In reference to program flow 600 in FIG. 6, index0, index1, and index2 (e.g., vertices $V_0$-$V_2$ from triangle primitive 510) are each processed with a vertex shader function $610_0$-$610_{N-1}$. In an embodiment, each index can be processed sequentially (e.g., one at a time) with vertex shader function $610_0$-$610_{N-1}$. For example, in vertex shader function $610_0$, index0 (e.g., vertex $V_0$ in triangle primitive 510) can be processed by the vertex shader function, followed by index1 (e.g., vertex $V_1$), and then index2 (e.g., vertex $V_2$). Although the operation in vertex shader function $610_0$ can be performed sequentially, vertex shader functions $610_1$-$610_{N-1}$ can perform the same sequential operation in parallel with vertex shader $610_0$.

In an embodiment, the results of vertex shader functions $610_0$-$610_{N-1}$ can be temporarily stored in a general purpose register (GPR) of a processor or microcontroller executing method 300 such as, for example, a single instruction, multiple data stream processor. General purpose registers are known to those persons of ordinary skill in the relevant art. In using GPRs, vertex shader functions $610_0$-$610_{N-1}$ are not required to write their results to a memory device prior to a geometry shader function accessing the data, unlike vertex shader function 110 described above with respect to FIG. 1.

In referring to FIG. 3, step 320 processes one or more vertex shader outputs with a geometry shader function, where the geometry shader function generates new primitive information associated with one emitted vertex. The geometry shader function emits a vertex (based on inputs received from the vertex shader functions in step 310) that contains information on a two-dimensional screen position and may also contain color and texture information. In an embodiment, the number of geometry shader operations that can be performed in parallel is equal to the N number of vertices described above with respect to step 310. This parallel configuration of geometry shader functions is illustrated in FIG. 6.

In program flow 600 in FIG. 6, geometry shader functions $620_0$-$620_{N-1}$ process three outputs from vertex shader functions $610_0$-$610_{N-1}$, respectively, in parallel. Unlike conventional geometry shader function 130 described in FIG. 1, geometry shader functions $620_0$-$620_{N-1}$ emit only primitive information associated with their respective vert_num parameter (i.e., only one emitted vertex per geometry shader function). For instance, in referring to geometry shader function $620_0$, this geometry shader function receives three outputs from vertex shader function $610_0$ and a vert_num parameter equal to '0', which corresponds to the $V_0'$ vertex in triangle strip 570. With these inputs, geometry shader function $620_0$ only outputs word information corresponding to the $V_0'$ vertex (vert_num=0). Likewise, in referring to geometry shader function $620_1$ in FIG. 6, this geometry shader function operates in parallel with geometry shader function $620_0$ and receives three outputs from vertex shader function $610_1$ and a vert_num parameter equal to '1', which corresponds to the $V_1'$ vertex in triangle strip 570. With these inputs, geometry shader function $620_1$ only outputs word information corresponding to the $V_1'$ vertex (vert_num=1). Geometry shader functions $620_2$-$620_{N-1}$ operate in parallel with geometry shader functions $620_0$ and $620_1$ and function in a similar manner to output word information corresponding to the $V_2'$-$V_6'$ vertices in triangle strip 570.

Further, geometry shader functions $620_0$-$620_{N-1}$ each receive a primID parameter input that is associated with an emitted geometric primitive. For instance, in referring to FIG. 5, emitted vertices $V_0'$-$V_6'$ (from geometry shader functions $620_0$-$620_{N-1}$, respectively) can have a primID=0 since they are generated based on triangle primitive 510. Connectivity of triangle strip 570 is described further below with respect to step 340.

In step 330 of FIG. 3, the primitive information for each emitted vertex is stored in a memory device. In an embodiment, since the outputs from geometry shader function $620_0$-$620_{N-1}$ can operate in parallel, the primitive information from each emitted vertex can be stored in parallel into the memory device. In program flow 600 of FIG. 6, geometry shader functions $620_0$-$620_{N-1}$ output primitive information corresponding to a particular vert_num parameter and primID parameter into the memory device through a memory load function 630.

Figure 7:
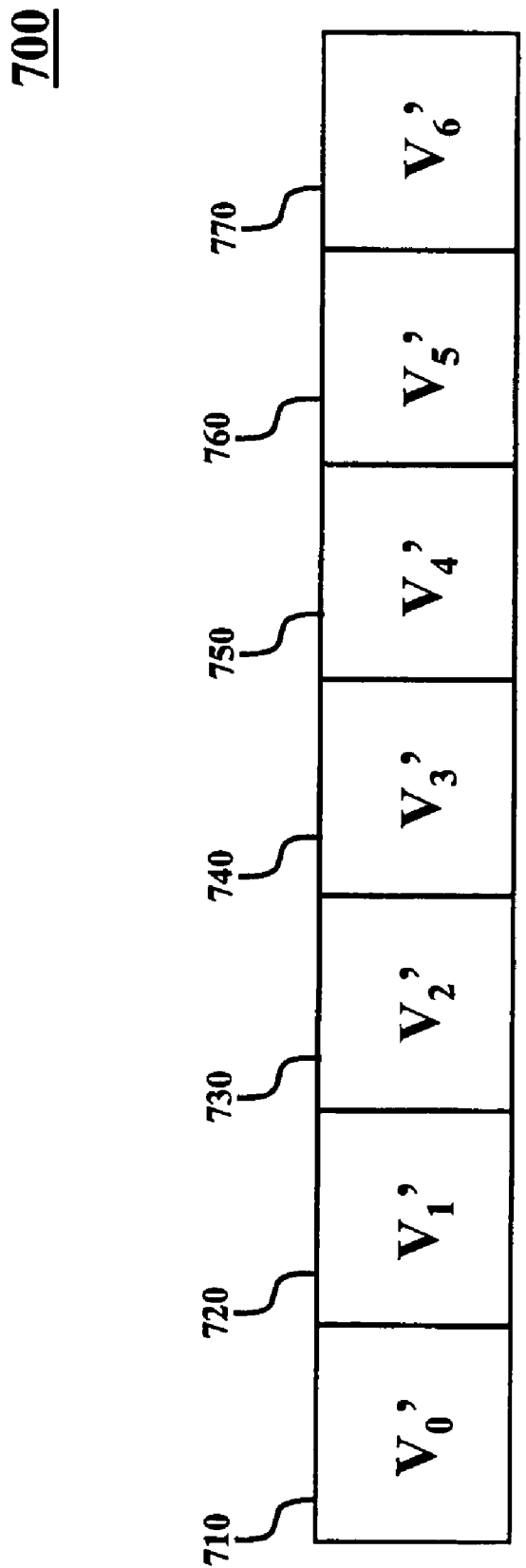
FIG. 7 is an illustration of an example cache memory for storing vertex information from a merged shader function in a method for increasing efficiency in a graphics pipeline.

In an embodiment, the primitive information for each emitted vertex can be stored in cache memory so that rasterizer 160 (in FIG. 4) can have rapid access to the data. FIG. 7 is an illustration of an example cache memory 700 storing the vertex information $V_0'$-$V_6'$ from geometry shader functions $620_0$-$620_{N-1}$ in memory locations 710-770, respectively. Unlike conventional graphics pipeline 100 in FIG. 1, the output from the geometry shader function is not stored in memory (e.g., on-chip or off-chip memory devices) and then copied to a cache memory device prior to rasterizer 160 processing the data. Rather, the output of the geometry shader function is directly stored in cache memory. In removing the memory device between the geometry shader and rasterizer operations, method 300 increases efficiency in the graphics pipeline by eliminating computation time expended on accessing memory.

Once all emitted vertices of a particular primID parameter have been processed and stored in the memory device, a "cut" can be inserted to indicate a boundary between one primID (e.g., primID=0) and a subsequent primID (e.g., primID=1) entering the graphics pipeline. For instance, some triangle strip compression techniques require a distinction between a start and end of a triangle strip (e.g., triangle strip 570), where this boundary between the start and end of the strip is called a cut. As mentioned above, a primID parameter can be associated with each geometric primitive (e.g., triangle primitive 510 in FIG. 5) entering the graphics pipeline.

In step 340, the stored emitted vertex information is connected into a geometric primitive prior to a rasterization operation. In referring to FIG. 6, connectivity function 640 can receive stored vertex information from memory load function 630. In an embodiment, a setup engine (not shown) in graphics pipeline 400 contains information on the connectivity of emitted vertices in triangle strip 570 (FIG. 5). In assembling the pixels from the memory device, the setup engine can use parameters such as vert_num and "cut" information to connect the emitted vertex information stored in memory. The setup engine, in turn, communicates the connectivity information to rasterizer 160 (in FIG. 4) so that rasterizer 160 can properly transform the data into a corresponding two-dimensional point to be displayed, for example, on a video monitor.

In sum, unlike the conventional graphics pipeline method described above with respect to FIG. 1, method 300 does not require access to memory between vertex shader and geometry shader functions or between geometry shader and copy shader functions. In reducing memory access when amplifying primitives, method 300 not only reduces overall graphics processing time but also alleviates bandwidth constraints in GPU memory by allowing other types of input data streams into the graphics pipeline to be processed using the GPU memory.

Figure 8:
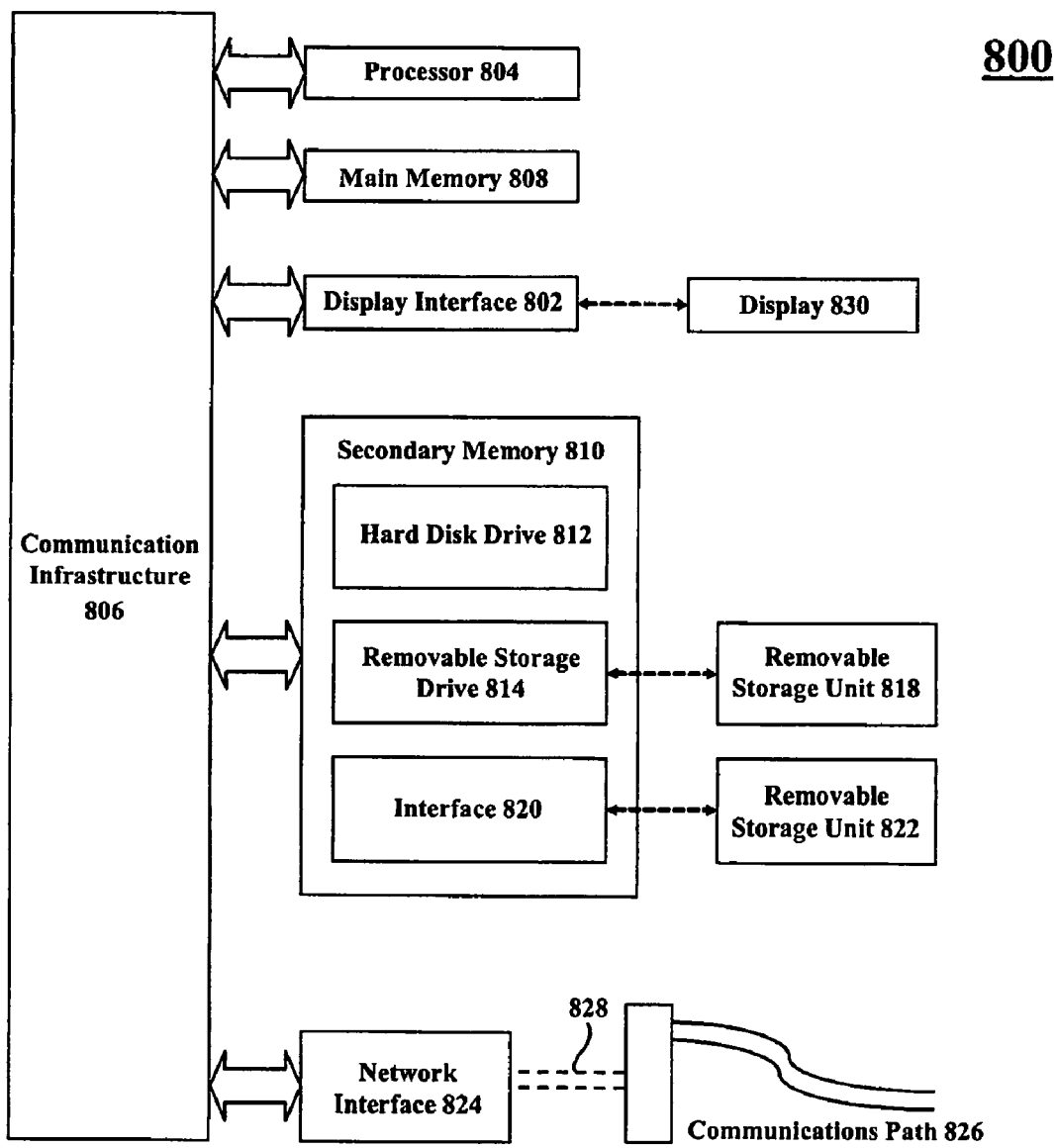
FIG. 8 is an illustration of an example computer system in which the present invention can be implemented.

Various aspects of the present invention can be implemented by software, firmware, hardware (or hardware represented by software such as, for example, Verilog or hardware description language instructions), or a combination thereof. FIG. 8 illustrates an example computer system 800 in which the present invention, or portions thereof, can be implemented as computer-readable code. For example, the methods illustrated by flowchart 300 of FIG. 3 can be implemented in system 800. Various embodiments of the invention are described in terms of this example computer system 800. After reading this description, it will become apparent to a person skilled in the relevant art how to implement the invention using other computer systems and/or computer architectures.

It should be noted that the simulation, synthesis and/or manufacture of the various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer usable medium including a semiconductor, magnetic disk, optical disk (such as CD-ROM, DVD-ROM) and as a computer data signal embodied in a computer usable (e.g., readable) transmission medium (such as a carrier wave or any other medium such as, for example, digital, optical, or analog-based medium). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

Computer system 800 includes one or more processors, such as processor 804. Processor 804 can be a special purpose or a general purpose processor. Processor 804 is connected to a communication infrastructure 806 (e.g., a bus or network).

Computer system 800 also includes a main memory 808, preferably random access memory (RAM), and can also include a secondary memory 810. Secondary memory 810 can include, for example, a hard disk drive 812, a removable storage drive 814, and/or a memory stick. Removable storage drive 814 can comprise a floppy disk drive, a magnetic tape drive, an optical disk drive, a flash memory, or the like. The removable storage drive 814 reads from and/or writes to a removable storage unit 818 in a well known manner. Removable storage unit 818 can comprise a floppy disk, magnetic tape, optical disk, etc. which is read by and written to by removable storage drive 814. As will be appreciated by persons skilled in the relevant art, removable storage unit 818 includes a computer-usable storage medium having stored therein computer software and/or data.

In alternative implementations, secondary memory 810 can include other similar devices for allowing computer programs or other instructions to be loaded into computer system 800. Such devices can include, for example, a removable storage unit 822 and an interface 820. Examples of such means can include a program cartridge and cartridge interface (such as those found in video game devices), a removable memory chip (e.g., EPROM or PROM) and associated socket, and other removable storage units 822 and interfaces 820 which allow software and data to be transferred from the removable storage unit 822 to computer system 800.

Computer system 800 can also include a communications interface 824. Communications interface 824 allows software and data to be transferred between computer system 800 and external devices. Communications interface 824 can include a modem, a network interface (such as an Ethernet card), a communications port, a PCMCIA slot and card, or the like. Software and data transferred via communications interface 824 are in the form of signals which can be electronic, electromagnetic, optical, or other signals capable of being received by communications interface 824. These signals are provided to communications interface 824 via a communications path 826. Communications path 826 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 818, removable storage unit 822, and a hard disk installed in hard disk drive 812. Signals carried over communications path 826 can also embody the logic described herein. Computer program medium and computer-usable medium can also refer to memories, such as main memory 808 and secondary memory 810, which can be memory semiconductors (e.g., DRAMs, etc.). These computer program products are ways for providing software to computer system 800.

Computer programs (also called computer control logic) are stored in main memory 808 and/or secondary memory 810. Computer programs can also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by flowchart 300 of FIG. 3, discussed above. Accordingly, such computer programs represent controllers of the computer system 800. Where the invention is implemented using software, the software can be stored in a computer program product and loaded into computer system 800 using removable storage drive 814, interface 820, hard drive 812 or communications interface 824.

The invention is also directed to computer program products comprising software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
    processing one or more vertices of a geometric primitive within a vertex shader function, wherein processed vertices output from the vertex shader function are temporarily stored;
    retrieving the temporarily stored processed vertices by a geometry shader function; and
    generating new primitive information within the geometry shader function based upon the processed vertices, the generating emitting a single vertex associated with the new primitive information,
    wherein the vertex shader function and the geometry shader function are implemented in a merged shader, the merged shader providing access for the geometry shader to directly retrieve the vertex shader output.

2. The method of claim 1, further comprising:
    storing the new primitive information for the emitted vertex in a memory device; and
    connecting a plurality of stored emitted vertices prior to a rasterization process in the graphics pipeline.

3. The method of claim 2, wherein the memory device is a cache memory.

4. The method of claim 2 further comprising indicating a boundary between two or more emitted geometric primitives in the graphics pipeline to facilitate connecting the plurality of stored emitted vertices.

5. The method of claim 2 further comprising a setup engine in the graphics pipeline for information on connectivity of vertices stored in the memory device.

6. The method of claim 1, wherein processing the one or more vertices of the geometric primitive within the vertex shader comprises receiving vertices of the geometric primitive.

7. The method of claim 1, further comprising processing the received vertices with the vertex shader configurable to perform a sequential or parallel operation.

8. The method of claim 1, wherein processing the one or more vertices of the geometric primitive within the vertex shader comprises performing the processing in parallel for N vertex shaders, N equal to a total number of vertices emitted by one or more geometry shaders.

9. The method of claim 1, wherein generating the new primitive information within the geometry shader comprises generating new primitive information associated with a vertex index, the vertex index indicative of a total number of vertices emitted by one or more geometry shaders.

10. The method of claim 9, wherein generating the new primitive information within the geometry shader comprises processing one or more inputs from the vertex shader in parallel for N geometry shaders, N equal to the total number of vertices emitted by the one or more geometry shaders.

11. The method of claim 1, wherein the processed vertices output from the vertex shader function are temporarily stored in a general purpose register.

12. A computer-readable storage device having computer program logic recorded thereon, execution of which, by a computing device, causes the computing device to perform operations comprising:
    processing one or more vertices of a geometric primitive within a vertex shader function, wherein processed vertices output from the vertex shader function are temporarily stored;
    retrieving the temporarily stored processed vertices by a geometry shader function; and
    generating new primitive information within the geometry shader function based upon the processed vertices, the generating emitting a single vertex associated with the new primitive information,
    wherein the vertex shader function and the geometry shader function are implemented in a merged shader, the merged shader providing access for the geometry shader to directly retrieve the vertex shader output.

13. The computer-readable storage device of claim 12, the operations further comprising:
    storing the new primitive information for the emitted vertex in a memory device; and
    connecting a plurality of stored emitted vertices prior to a rasterization process in the graphics pipeline.

14. The computer-readable storage device of claim 12, the operations further comprising:
    processing the received vertices with the vertex shader configurable to perform a sequential or parallel operation.

15. The computer-readable storage device of claim 12, wherein processing the one or more vertices of the geometric primitive within the vertex shader comprises:
performing the processing in parallel for N vertex shaders, N equal to a total number of vertices emitted by one or more geometry shaders.

16. The computer-readable storage device of claim 12, wherein generating the new primitive information within the geometry shader comprises:
generating the new primitive information associated with a vertex index, the vertex index indicative of a total number of vertices emitted by one or more geometry shaders.

17. The computer-readable storage device of claim 16, wherein generating the new primitive information within the geometry shader further comprises:
processing the one or more inputs from the vertex shader in parallel for N geometry shaders, N equal to the total number of vertices emitted by the one or more geometry shaders.

18. The computer-readable storage device of claim 12, wherein the processed vertices output from the vertex shader function are temporarily stored in a general purpose register.

19. A system for processing data in a graphics pipeline, comprising:
a first module configured to process one or more vertices of a geometric primitive within a vertex shader function, wherein processed vertices output from the vertex shader function are temporarily stored;
a second module configured to retrieve the temporarily stored processed vertices by a geometry shader function; and
a third module configured to generate new primitive information within the geometry shader function based upon the processed vertices, and to emit a single vertex associated with the new primitive information, wherein the vertex shader function and the geometry shader function are implemented in a merged shader, the merged shader providing access for the geometry shader to directly retrieve the vertex shader output.

20. The system of claim 19, further comprising:
a third module configured to store the new primitive information for the emitted vertex in a memory device; and
a fourth module configured to connect a plurality of stored emitted vertices prior to a rasterization process in the graphics pipeline.

21. The system of claim 19 further comprising:
a module configured to process the received vertices with the vertex shader in a sequential or parallel operation.

22. The system of claim 19, wherein the first module comprises:
a module configured to perform the processing in parallel for N vertex shaders, N equal to a total number of vertices emitted by one or more geometry shaders.

23. The system of claim 19, wherein the second module comprises:
a module configured to generate new primitive information associated with a vertex index, the vertex index indicative of a total number of vertices emitted by one or more geometry shaders.

24. The system of claim 23, wherein the module for generating new primitive information comprises:
a module configured to process one or more inputs from the vertex shader in parallel for N geometry shaders, N equal to the total number of vertices emitted by the one or more geometry shaders.

25. The system of claim 19, wherein the processed vertices output from the vertex shader function are temporarily stored in a general purpose register.

* * * * *